(12) United States Patent
Kamohara et al.

(10) Patent No.: US 8,171,060 B2
(45) Date of Patent: May 1, 2012

(54) STORAGE SYSTEM AND METHOD FOR OPERATING STORAGE SYSTEM

(75) Inventors: Toshiki Kamohara, Odawara (JP); Shiori Inoue, Kawasaki (JP); Naoto Yanagi, Kamakura (JP)

(73) Assignee: Hitachi, Ltd., Tokyo (JP)

( * ) Notice: Subject to any disclaimer, the term of this patent is extended or adjusted under 35 U.S.C. 154(b) by 450 days.

(21) Appl. No.: 12/309,136

(22) PCT Filed: Dec. 3, 2008

(86) PCT No.: PCT/JP2008/072363
§ 371 (c)(1),
(2), (4) Date: Jan. 8, 2009

(87) PCT Pub. No.: WO2010/064327
PCT Pub. Date: Jun. 10, 2010

(65) Prior Publication Data
US 2011/0145197 A1 Jun. 16, 2011

(51) Int. Cl.
*G06F 7/00* (2006.01)
*G06F 17/30* (2006.01)

(52) U.S. Cl. ..................................... 707/812

(58) Field of Classification Search ............ 707/E17.011
See application file for complete search history.

(56) References Cited

U.S. PATENT DOCUMENTS 5,822,780 A 10/1998 Schutzman
7,278,000 B2 * 10/2007 Nonaka et al. ............... 711/163
2005/0120188 A1 * 6/2005 Kuwabara et al. ............ 711/159
2006/0230076 A1 * 10/2006 Gounares et al. ............. 707/200
2006/0288048 A1 12/2006 Kamohara et al.

FOREIGN PATENT DOCUMENTS
JP 2006-350599 6/2005

OTHER PUBLICATIONS

International Search Report mailed Aug. 18, 2009.

* cited by examiner

*Primary Examiner* — Rehana Perveen
*Assistant Examiner* — Muluemebet Gurmu
(74) *Attorney, Agent, or Firm* — Stites & Harbison, PLLC; Juan Carlos A. Marquez, Esq

(57) ABSTRACT

By considering a device life and time needed for data migration, data stored in a storage apparatus is securely preserved until a retention term of each of the data. Multiple disk devices 40A to 40C that store a data file generated by a service server apparatus 30 are included. A migration manager 11 of a management server apparatus 10 acquires preservation period information that indicates a preservation period of the data file from the service server apparatus 30, and calculates a preservation term of the data file based on the preservation period information. The migration manager 11 of the management server apparatus 10 also acquires data amount information of the data file from the service server apparatus 30, and calculates a necessary time needed for migrating the data file to other disk devices A40A to 40C. When the preservation term comes later than an operation guarantee term recorded in advance for each of the disk devices 40A to 40C, the migration manager 11 of the management server apparatus 10 compares the end of the migration with the operation guarantee term, and determines the necessity of the migration.

8 Claims, 24 Drawing Sheets

MIGRATION DESTINATION ATTRIBUTE TABLE 200

| | A | B | C | ... |
|---|---|---|---|---|
| DEVICE NAME | a1 | b1 | c1 | ... |
| INITIAL REGISTRATION DATE | a2 | b2 | c2 | ... |
| DEVICE GUARANTEE TERM (UP TO XX) | a3 | b3 | c3 | ... |
| GUARANTEE THRESHOLD (UP TO YY) | a4 | b4 | c4 | ... |
| TOTAL CAPACITY (TB) | | | | |
| CURRENTLY USED AMOUNT (TB) | a5 | b5 | c5 | ... |

RETENTION TERM MANAGEMENT TABLE FOR EACH TASK 300

| ITEM NUMBER | SERVER 301 | VOLUME 302 | RETENTION PERIOD 303 | RETENTION UNIT 304 |
|---|---|---|---|---|
| 1 | D | TASK D1 | α1 | ONE YEAR |
| 2 | D | TASK D2 | β1 | ONE YEAR |
| 3 | D | TASK D3 | γ1 | ONE YEAR |
| ... | ... | ... | ... | ... |
| 5 | E | TASK E1 | α1 | ONE YEAR |
| 6 | E | TASK E2 | β1 | ONE YEAR |
| ... | ... | ... | ... | ... |

FIG. 3

MIGRATION MANAGEMENT TABLE FOR EACH TASK ID 400

| ITEM NUMBER | VOLUME | MIGRATION INTERVAL | POLLING INTERVAL | SAMPLING AMOUNT |
|---|---|---|---|---|
| 1 | TASK D1 | ONE YEAR | ONE MONTH | 1% |
| 2 | TASK D2 | ONE YEAR | ONE MONTH | 1% |
| 3 | ... | | ... | ... |
| 5 | TASK E1 | ONE YEAR | ONE MONTH | 1% |
| 6 | TASK E2 | ONE YEAR | ONE MONTH | 1% |
| ... | ... | | ... | ... |

MIGRATION OPERATION MANAGEMENT TABLE 500

| SERVER | D | E | ... |
|---|---|---|---|
| MIGRATION ALLOWABLE PERIOD | d1 | b1 | ... |
| CPU UTILIZATION RATE | d2 | b2 | ... |
| MIGRATION PROHIBITION PERIOD | d3 | b3 | ... |
| MIGRATION SCHEDULE PERIOD | EVERY HALF A YEAR | EVERY HALF A YEAR | ... |

501 → SERVER
502 → MIGRATION ALLOWABLE PERIOD
503 → CPU UTILIZATION RATE
504 → MIGRATION PROHIBITION PERIOD
505 → MIGRATION SCHEDULE PERIOD

FIG. 5

FILE INFORMATION MANAGEMENT TABLE

| ITEM NUMBER | SERVER | VOLUME | FILE NAME | CREATION DATE AND TIME | SIZE |
|---|---|---|---|---|---|
| 1 | D | TASK D1 | f1 | g1 | h1 |
| 2 | D | TASK D1 | f2 | g2 | h2 |
| ... | ... | ... | ... | ... | ... |
| n | D | TASK Dn | fn | gn | hn |
| n+1 | E | TASK E1 | f'1 | g'1 | h'1 |
| n+2 | E | TASK E1 | f'2 | g'2 | h'2 |
| ... | ... | ... | ... | ... | ... |
| m | E | TASK Em | f'm | g'm | h'm |

MIGRATION DATA AMOUNT PREDICTION TABLE 1000

| ITEM NUMBER | TASK ID | RETENTION TERM | FIRST CAPACITY | SECOND CAPACITY | ... | n-TH CAPACITY | TOTAL AMOUNT OF MIGRATION |
|---|---|---|---|---|---|---|---|
| 1 | α | XX/04 | H1 | H2 | ... | Hn | H |
| 2 | β | YY/04 | I1 | I2 | ... | In | I |
| 3 | ... | ... | ... | ... | ... | ... | |

1001, 1002, 1003, 1004

UNIT OF CAPACITY: TB

| ITEM NUMBER | DEVICE | PRIORITY |
|---|---|---|
| 1 | A | 1 |
| 2 | B | 2 |
| 3 | C | 3 |
| ... | ... | ... |

MIGRATION DESTINATION PRIORITY TABLE 1200

MIGRATION DESTINATION DETERMINATION TABLE 1500

| ITEM NUMBER | RETENTION TERM | TOTAL CAPACITY (TB) | MIGRATION DESTINATION DISK DEVICE ||||
| --- | --- | --- | --- | --- | --- | --- |
| | | | DEVICE A | DEVICE B | DEVICE C | ... |
| 1 | XX/04 | H | H' | H'' | H''' | ... |
| 2 | YY/04 | I | I' | I'' | I''' | ... |
| ... | ... | ... | ... | ... | ... | ... |

MIGRATION TEST RESULT TABLE 1600

| ITEM NUMBER | RETENTION TERM | MIGRATION TEST CAPACITY | NECESSARY TIME | | | | MIGRATION RATE | | | |
|---|---|---|---|---|---|---|---|---|---|---|
| | | | DEVICE A | DEVICE B | DEVICE C | ... | DEVICE A | DEVICE B | DEVICE C | ... |
| 1 | XX/04 | H/100 | tH' | tH'' | tH''' | ... | vH' | vH'' | vH''' | ... |
| 2 | YY/04 | I/100 | tI' | tI'' | tI''' | ... | vI' | vI'' | vI''' | ... |
| ... | ... | ... | ... | ... | ... | ... | ... | ... | ... | ... |

MIGRATION FLAG DETERMINATION TABLE 1800

| ITEM NUMBER | RETENTION TERM | MIGRATION CAPACITY (TB) | MIGRATION TIME | | |
| --- | --- | --- | --- | --- | --- |
| | | | DEVICE A | DEVICE B | DEVICE C |
| 1 | XX/04 | H | TH' | TH'' | TH''' |
| 2 | YY/04 | I | TI' | TI'' | TI''' |
| ... | ... | ... | ... | ... | ... |

STORAGE SYSTEM AND METHOD FOR OPERATING STORAGE SYSTEM

TECHNICAL FIELD

The present invention relates to a storage system and a method for operating the storage system, and particularly relates to a storage system and a method for operating the storage system in which data stored in a storage apparatus can securely be kept until a retention term of each data, while a device life of the storage apparatus and time necessary for data migration are taken into consideration.

BACKGROUND ART

A huge amount of data processed and generated by business applications is kept in a storage system including a disk device having a large capacity, or the like, while periods during which the data should be kept vary depending on an attribute of each data, or regulations with regard to the data processing, statutes, etc.

Such a retention term of the data reaches not less than 10 years at the maximum, and may exceed a device life of storage apparatuses such as the disk device, the device life being usually approximately 5 years. When the storage apparatus that stores the data during the retention period of the data reaches the device life, it is necessary to copy the data (perform data migration) to other storage apparatus having a longer device life before a failure does not occur in the storage apparatus that stores the data so that the data can be securely accessed until the retention term expires.

From such a viewpoint, Japanese Unexamined Patent Application Publication No. 2006-350599 has proposed a technique, for example, in which several types of file groups whose last retention terms are going to expire are collectively managed, and migration is performed on the basis of priority of the storage apparatus, the device life, and the retention term of the file.

However, since time actually necessary for migration is not taken into consideration in the above-mentioned literature, there has been a problem that, for example, the storage apparatus of a data storage source may reach the device life while migration is performed, and secure data integrity by migration cannot be achieved.

DISCLOSURE OF INVENTION

An object of the present invention is to provide a storage system and a method for operating the storage system in which data stored in a storage apparatus can be securely kept until a retention term of each data, while a device life of a storage apparatus and time necessary for data migration are taken into consideration.

One of aspects according to the present invention for solving the above-mentioned problem and other problems is a storage system including: a storage apparatus that provides a plurality of logical volumes allocated to a server apparatus as a storage area that stores a data file generated by the server apparatus; and multiple storages that are coupled to the storage apparatus and provides a storage area to which the data file stored in the storage apparatus is copied. The storage system also includes a data copy processing unit that acquires preservation period information that indicates a preservation period of the data file from the server apparatus, and calculates the preservation term of the data file from the preservation period information.

The data copy processing unit acquires data amount information of the data file from the server apparatus, and calculates data copy necessary time needed to copy the data file from one storage of the multiple storages in which the data file is stored, to other storage of the multiple storages. Moreover, the data copy processing unit compares an end of the data copy needed time with an operation guarantee term, and determines whether it is necessary to perform data copy of the data file, when the preservation term comes later rather than the operation guarantee term recorded in advance for each of the multiple storages.

Besides this, problems disclosed by this application and a solution therefor will be clarified with the column of the best mode for carrying out the invention and the accompanying drawings.

According to the present invention, data stored in a storage apparatus can be securely kept until a retention term of each of the data, by considering a device life of the storage apparatus and time necessary for data migration.

BRIEF DESCRIPTION OF THE DRAWINGS

FIG. 2 shows an example of a migration destination attribute table 200.

FIG. 3 shows an example of a retention term management table 300 for each task.

FIG. 4 shows an example of a migration management table 400 for each task ID.

FIG. 5 shows an example of a migration operation management table 500.

FIG. 8 shows an example of a file information management table 800.

FIG. 10 shows an example of a migration data amount prediction table 1000.

FIG. 15 shows an example of a migration destination determination table 1500.

FIG. 16 shows an example of a migration test result table 1600.

FIG. 18 shows an example of a migration flag determination table 1800.

MODE FOR CARRYING OUT THE INVENTION

Figure 1A:
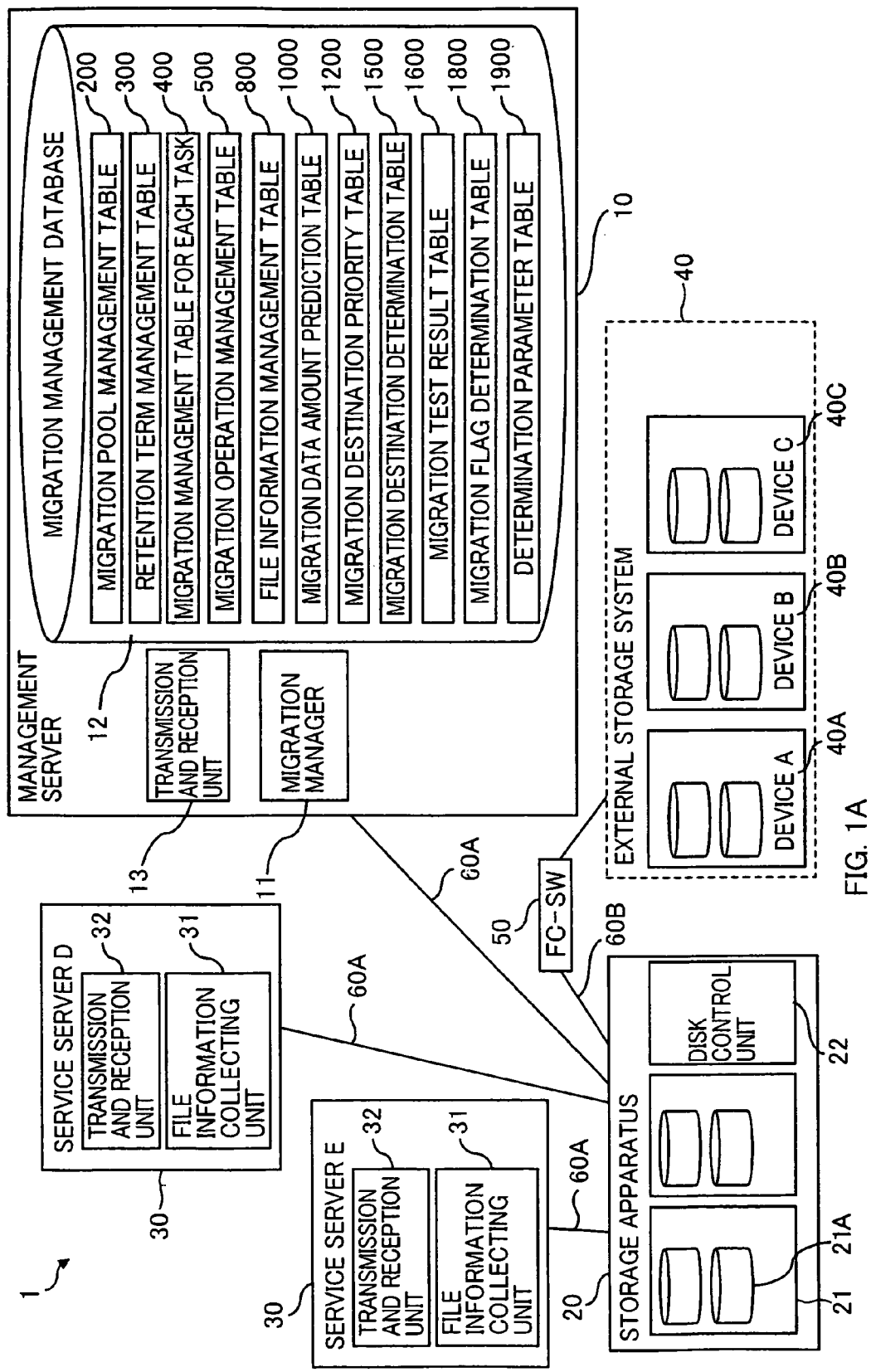
FIG. 1A is a diagram showing hardware of a storage system 1.

Hereinafter, an embodiment will be described, referring to the drawings. A term of "migration" used herein means a data copy processing between storages such as disk devices.

FIG. 1A shows a hardware configuration of a storage system 1 described as an embodiment of the present invention. As shown in the drawing, this storage system 1 includes a management server apparatus 10, a storage apparatus 20, service server apparatuses 30, an external storage system 40, and a fiber channel (Fiber Channel, hereinafter, "FC") switch 50. The service server apparatuses 30 and the management server apparatus 10 are coupled with the storage apparatus 20 by a FC network 60A. The storage apparatus 20 is also coupled with the external storage system 40 by an FC network 60B through the FC switch 50.

The service server apparatuses 30 are, for example, computers (information processing apparatus) such as personal computers and workstations, and perform data processing using various business applications. A storage area provided in the storage apparatus 20 described later is allocated to each service server apparatus 30 as an area in which data processed by respective service server apparatus 30 is stored. In each service server apparatus 30, a file information collecting unit 31 is provided, so as to collect header information or the like of a data file being processed by the service server apparatus 30, and to send it to the management server apparatus 10, as described later.

In response to a request from a migration manager 11 located in the management server apparatus 10 described later, the file information collecting unit 31 acquires information, such as a preservation period of the data file or the like, in file units by header information or the like, of a data file stored in the storage area within the storage apparatus 20 allocated to each service server apparatus 30, and then sends such information to the migration manager 11.

In addition, a transmission and reception unit 32 is also provided in each service server apparatus 30, and performs data transmission and reception processing to and from the management server apparatus 10.

The external storage system 40 is configured by coupling multiple disk devices 40A, 40B, and 40C to each other by SAN (Storage Area Network), and provides a storage area used as a migration destination of data files of each service server apparatus 30 that are stored respectively in the storage areas of the storage apparatus 20.

The FC switch 50 is an interface that couples the storage apparatus 20 to the external storage system 40.

The management server apparatus 10 is a management computer in which primary functions of the present embodiment are implemented. The management server apparatus 10 is provided with the migration manager 11 which has a function to migrate a data file stored within the storage apparatus 20 to the storage area within the external storage system 40 on a basis of file information or the like acquired from the file information collecting unit 31 of each service server apparatus 30.

A migration management database 12 is also provided in the management server apparatus 10. The migration management database 12 stores a migration destination attribute table 200, a retention term management table 300 for each task, a migration management table 400 for each task ID, a migration operation management table 500, a file information management table 800, a migration data amount prediction table 1000, a migration destination priority table 1200, a migration destination determination table 1500, a migration test result table 1600, a migration flag determination table 1800, and a determination parameter table 1900. These tables are referred when the migration manager 11 executes migration management. Roles of these tables will be described later.

A transmission and reception unit 13 is also provided in the management server apparatus 10, and performs data transmission and reception processing to and from the service server apparatuses 30.

Figure 1B:
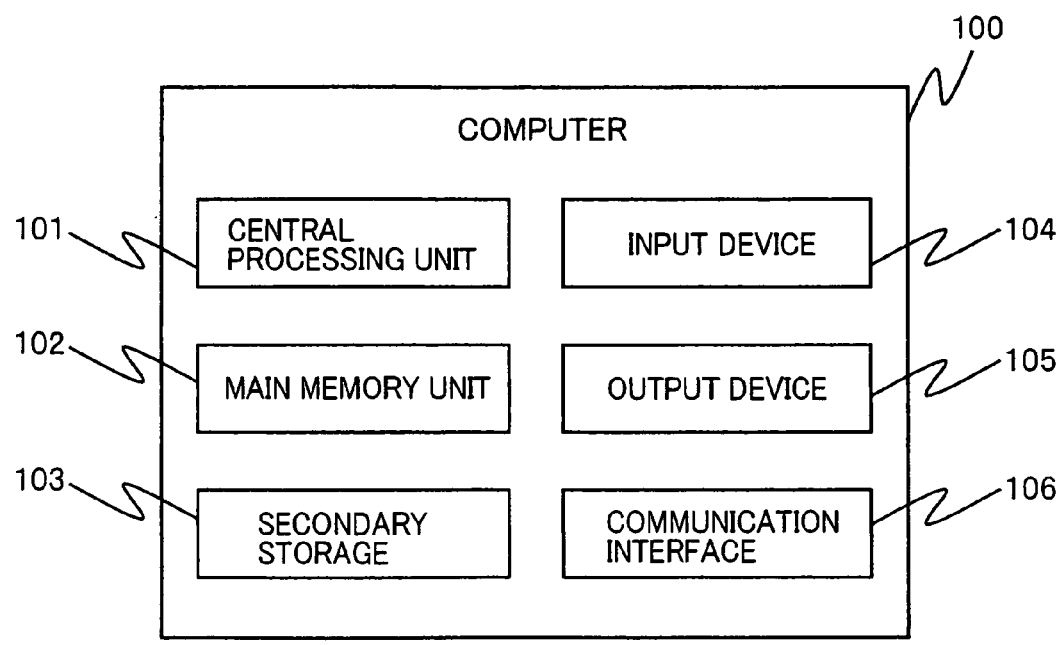
FIG. 1B is a diagram showing an example of a hardware configuration of a computer that can be used as a management server apparatus 10 and a service server apparatus 30.

FIG. 1B shows an example of a computer that can be used as the management server apparatus 10 or the client apparatus 30. This computer 100 includes: a central processing unit 101 (for example, a CPU (Central Processing Unit) or MPU (Micro Processing Unit)); a main memory unit 102 (for example, a RAM (Random Access Memory) or ROM (Read Only Memory)); a secondary storage 103 (for example, a hard disk); an input device 104 that accepts a user's input operation (for example, a keyboard or mouse); an output unit 105 (for example, a liquid crystal display monitor); and a communication interface 106 that realizes communication with another apparatus (for example, a NIC (Network Interface Card) or HBA (Host Bus Adapter)).

Functions of the migration manager 11 of the management server apparatus 10 and the file information collecting unit 31 of each service server apparatus 30 are realized when the central processing unit 101 reads a program for the functions that is respectively stored in the secondary storage 103 onto the main memory unit 102, and executes the program.

The storage apparatus 20 provides the above-mentioned storage area that the service server apparatus 30 uses. As illustrated, the above-mentioned storage area 21 for exclusive use is respectively allocated to each service server apparatus 30, and each storage area 21 is formed of logical volumes (Logical Volume) 21A. In the present embodiment, each logical volume 31A is allocated to each of the business applications operating on the respective service server apparatuses 30. The storage apparatus 20 has an FC interface (illustration is omitted) that performs writing or reading of the data to and from a cache memory (illustration is omitted) while communicating with the cache memory, the management server apparatus 10, the service server apparatus 30, and the external storage system 40. The storage apparatus 20 also includes a disk controller 22 that performs writing or reading of the data to and from the disk device while performing writing or reading of the data to and from the cache memory. In the storage apparatus 20, the disk device is operated by using the RAID (Redundant Array of Inexpensive Disks) scheme.

Next, the tables referred in the present embodiment will be described.

First, the migration destination attribute table 200 will be described. FIG. 2 shows an example of the migration destination attribute table 200. This migration destination attribute table 200 manages attributes that disk held by units 40A to 40C configuring the external storage system 40. In the migration destination attribute table 200, each item of a device name 201, an initial registration date 202, a device guarantee term 203, a guarantee threshold 204, a total capacity 205, and a currently used capacity 206 is recorded.

The device name 201 is an identification code given in order to distinguish the disk devices 40A to 40C from one another, and the identification codes A to C are recorded in this example. Note that, hereinafter, when describing operation of the present embodiment, the disk devices included in the external storage system 40 may be referred to as the disk devices A to C.

The initial registration date 202 indicates a date when each of the disk devices 40A to 40C within the external storage system 40 is registered into the storage system 1 of the present embodiment for the first time. The device guarantee term 203 is a term of an operation guarantee given to each of the disk devices 40A to 40C, and the data including year, month and day may be recorded for example. Using the disk devices 40A to 40C beyond this term is prohibited since such use is out of a range of the guarantee of operation.

The guarantee threshold 204 is a term set at a point of time before the operation guarantee term 203 (for example, two months before the operation guarantee term 203) in order to securely prevent the use of each of the disk devices 40A to 40C beyond the operation guarantee term 203. Each item of the above-mentioned device name 201, initial registration date 202, device guarantee term 203, and guarantee threshold 204 is recorded in the migration destination attribute table 200 before the storage system 1 of the present embodiment is introduced.

The total capacity 205 is a total disk capacity usable in each of the disk devices 40A to 40C. In the currently used capacity 206, a disk capacity actually used for data storage at present is recorded. The total capacity 205 and the currently used capacity 206 are acquired when the migration manager 11 of the management server apparatus 10 collects device information on each of the disk devices 40A to 40C in accordance with a predetermined protocol. The total capacity 205 and the currently used capacity 206 are then recorded in the migration destination attribute table 200.

Next, the retention term management table 300 for each task will be described. FIG. 3 shows an example of the retention term management table 300 for each task. In this retention term management table 300 for each task, a server name 301, a volume name 302, a retention period 303, and a retention unit 304 are recorded.

The server name 301 indicates an identification code given to each service server apparatus 30. In the illustrated example, the identification codes D and E are respectively given to the two service server apparatuses 30 included in the storage system 1 of the present embodiment. Note that, hereinafter, when describing the operation of the present embodiment, the service server apparatuses included in the storage system 1 may be referred to as the server apparatuses D and E, respectively.

The volume name 302 indicates an identification code of a task using the corresponding logical volume 21A configuring the storage area within the storage apparatus 20, the storage area being allocated to the corresponding service server apparatus 30. As mentioned above, each logical volume 21A is allocated to the corresponding business application that is operating on the corresponding service server apparatus 30. Thus, in the illustrated example, a task ID that is an identification code given to each business application such as "task D1" is given as the volume name 302.

The retention period 303 indicates a retention period specified with regard to the data file stored in each logical volume 21A. In the present embodiment, a policy with regard to the retention period of the data file is specified for each business application of the corresponding logical volume 21A.

In the retention unit 304, a period used as a data file retention unit specified for each logical volume 21A is recorded. In the present embodiment, the retention period is set at one year as a smallest unit, and the period is from April 1 to March 31.

Next, the migration management table 400 for each task ID will be described. FIG. 4 shows an example of the migration management table 400 for each task ID. In this migration management table 400 for each task ID, a logical volume name 401, a migration interval 402, a polling interval 403, and a sampling amount 404 are recorded.

The volume name 401 is a task ID given to each logical volume 21A, as the retention term management table 300 for each task has been described. The migration interval 402 indicates a time interval for the data file stored in the logical volume 21A identified by one task ID, to be migrated to the external storage system 40. In the illustrated example, the migration interval 402 is set at one year.

The polling interval 403 specifies a time interval at which the migration manager 11 of the management server apparatus 10 requests information from the file information collecting unit 31 of the corresponding service server apparatus 30 for each logical volume 21A, the information being used when the migration manager 11 of the management server apparatus 10 performs migration management operation. In the illustrated example, the polling interval 403 is set at one month.

The sampling amount 404 sets the proportion of data to be used according to the actual data size to be migrated, for a migration test described later. While a proportion is specified as 1% in the illustrated example, a concrete data size (for example, 10 GB) can be used for such specification.

Next, the migration operation management table 500 will be described. FIG. 5 shows an example of the migration operation management table 500. In this migration operation management table 500, a migration allowable period 502, an utilization rate of a CPU being used 503, a migration prohibition period 504, and a migration schedule interval 505 are recorded for each server name 501 described with regard to the retention term management table 300 for each task.

For each service server apparatus 30, the migration allowable period 502 specifies a time zone to allow to perform migration of the data file managed by the corresponding service server apparatus 30, for example, from 0:00 a.m. to 4:00 a.m. every day. This is set in order to avoid a trouble which may cause in an original task assigned to each service server apparatus 30 by performing migration. The migration allowable period 502 is also used as a constraint for bringing a condition of the migration test closer to an actual condition of migration, at the time of the migration test described later.

The CPU utilization rate 503 specifies an upper limit of a usage rate permitted in the CPU of each service server apparatus 30 at the time of migration. This item is also specified for the same purpose as the migration allowable period 502.

In the migration prohibition period 504, certain data files are excluded from the data files that are stored in the logical volumes 21A and that are subjected to migration, if they have not passed a certain period of time after being generated by the service server apparatuses 30. By not immediately setting the just generated data file as a migration target, a size of the data files can be minimized.

In the migration schedule interval 505, a time interval of migration execution schedule time (half a year, in the illustrated example) is set.

Figure 6:
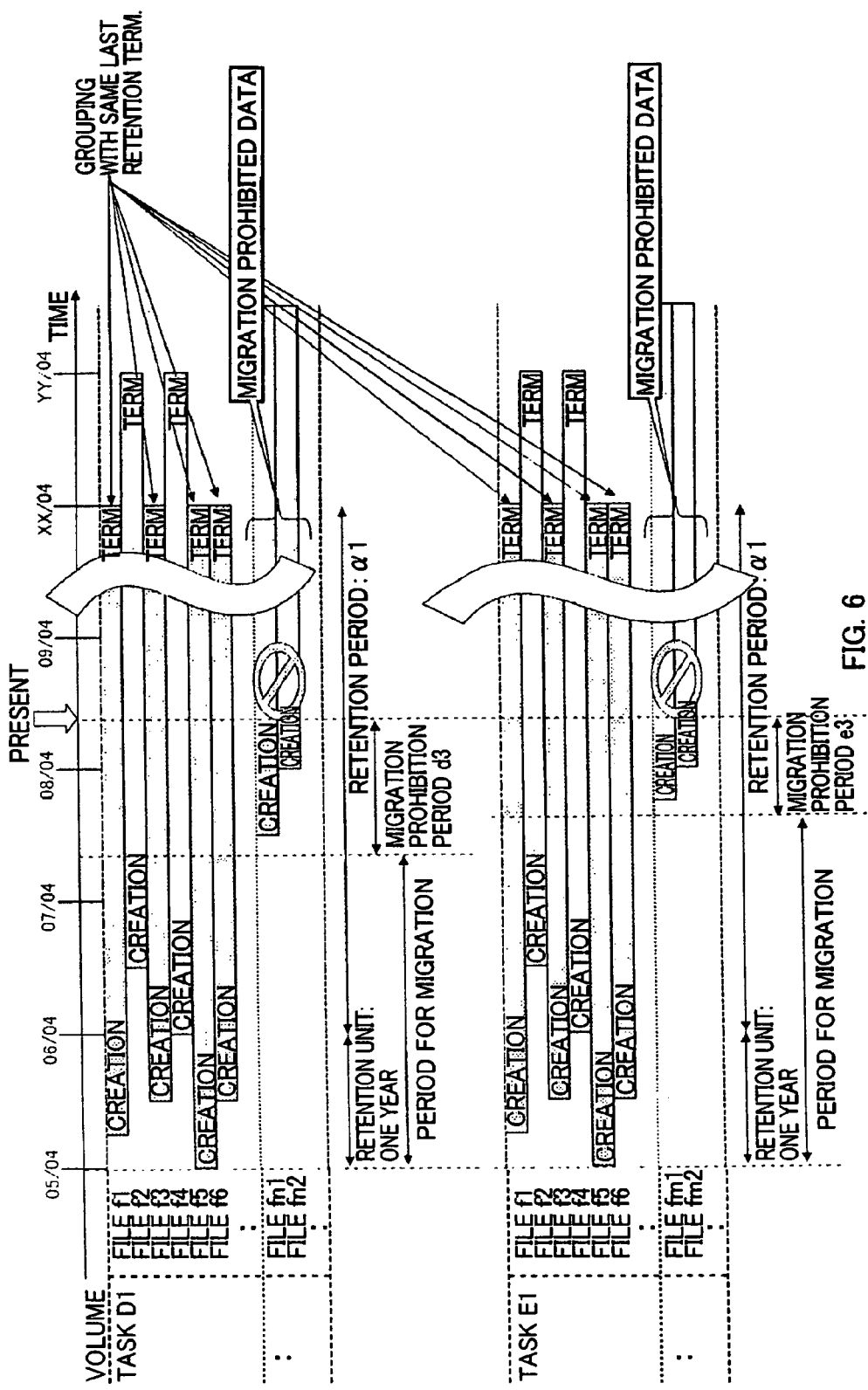
FIG. 6 is an explanatory view schematically showing a retention condition of a data file in each logical volume 21A.

FIG. 6 schematically shows a situation of storage management of the data file in each logical volume 21A specified with the above-mentioned retention term management table 300 for each task, migration management table 400 for each task ID, and migration operation management table 500. As illustrated, it can be seen that, in the present embodiment, for the data files stored in the same logical volume 21A (for example, volume identified by "task D1"), the data files having the same last retention term is grouped to manage migration of each data file.

Next, based on the above-mentioned system configuration and reference tables stored in the migration management database 12 in advance, migration management function performed by the migration manager 11 will be described by referring to the related process flows, tables, schematic explanatory views and the like.

==Polling for Migration Management==

Figure 7:
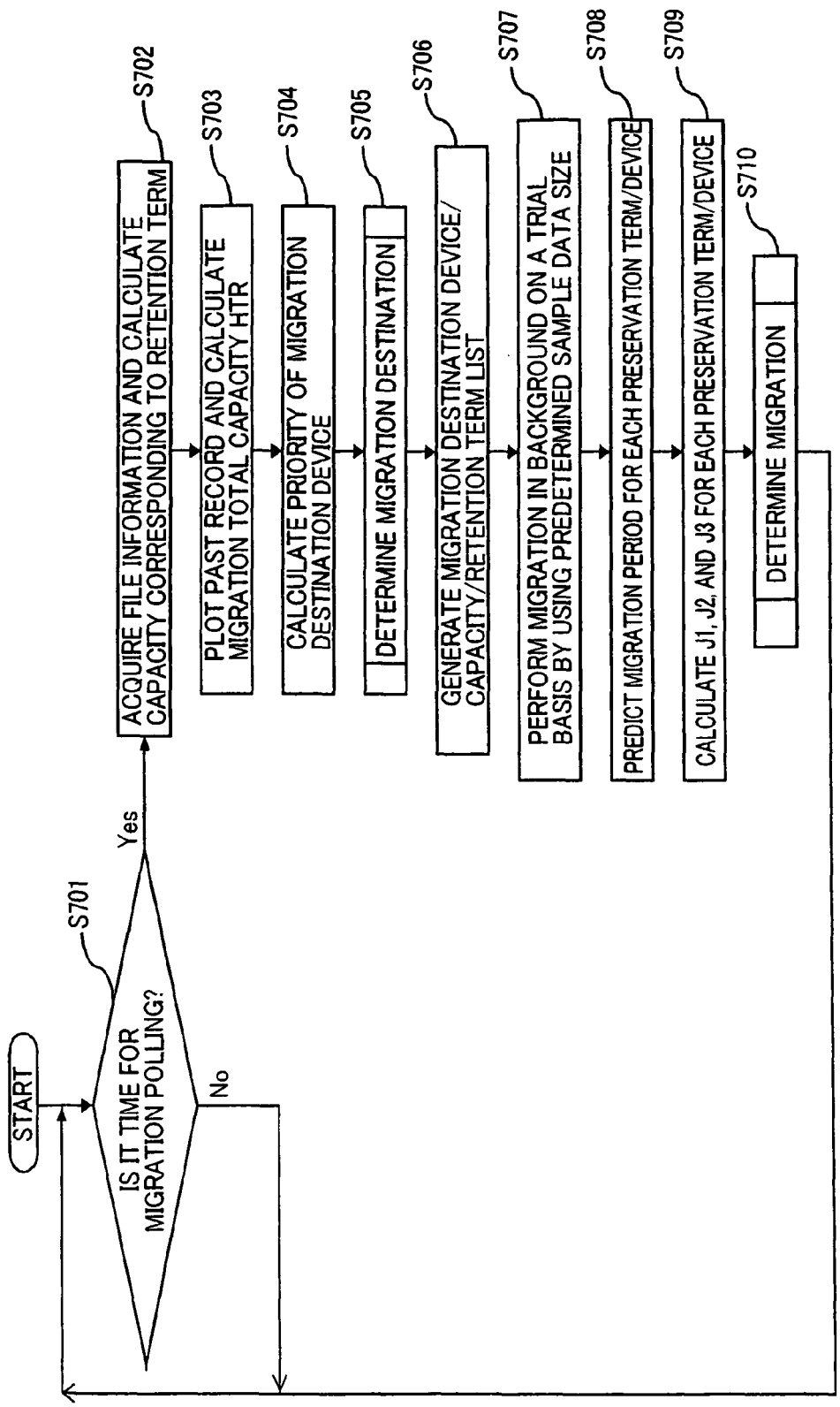
FIG. 7 shows an example of a flow of a migration polling processing.

FIG. 7 shows a flow of a polling processing performed at predetermined time intervals in order to perform migration management in the present embodiment. This polling processing includes a series of migration processing, in which, in order to execute migration management according to the present embodiment, the migration manager 11 collects the information on the data file stored within the storage apparatus 20 from the file information collecting unit of each service server apparatus 30, and on the basis of based on these information, the device life of the migration destination disk devices 40A to 40C and the preservation term of each data file in the external storage system 40 are taken into consideration. Note that, each reference numeral S in the drawing of the process flows indicates a step.

First, referring to the polling interval 403 recorded in the migration management table 400 for each task ID, the migration manager 11 monitors whether or not a polling time specified in the predetermined polling interval 403 arrives for each task ID, i.e., the volume 21A within the storage apparatus 20 (S701). When determining that it is not the polling time (S701, No), the migration manager 11 continues monitoring as it is, and stands by.

When determining that the polling execution time arrives (S701, Yes), the migration manager 11 requests the file information collecting unit 31 of each service server apparatus 30 to acquire the information on the data file stored in each volume 21A of the storage apparatus 20 from the file system of each service server apparatus 30, and to send the information. Then, the migration manager 11 calculates the total capacity of the data for each the retention term of the file, from the acquired file information (S702).

The migration manager 11 records the acquired file information in the file information management table 800 of the migration management database 12. FIG. 8 shows an example of the file information management table 800. In the file information management table 800, on the basis of the file information acquired from the file information collecting units 31 of the respective service server apparatuses 30, a server name 801 that is a management source of the data file, a volume name 802, a file name 803, a file creation date and time 804, and a capacity 805 of the file are recorded.

According to the file creation date and time 804 and the volume name 802 to which the file belongs, the migration manager 11 acquires the retention period 303 corresponding in the retention term management table 300 for each task. Then the migration manager 11 adds the acquired retention term 303 to the file creation date and time 804, hence calculating a date and time that are the retention term of the file. Moreover, according to the volume name 802 under which the file is stored, the migration manager 11 acquires the retention unit 304 corresponding in the retention term management table 300 for each task.

Figure 9:
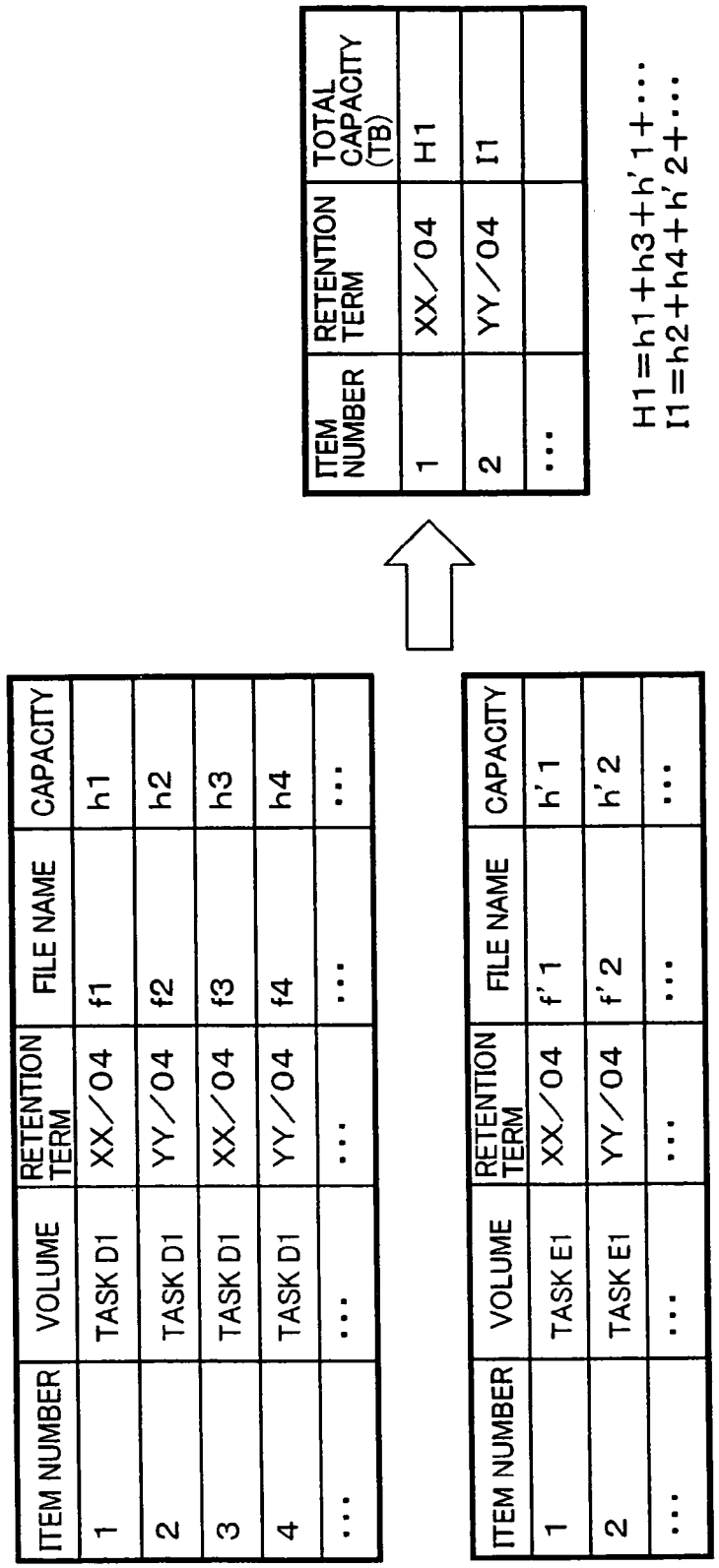
FIG. 9 is a diagram illustrating calculation of a total capacity for each retention term.

When the retention term is calculated for all the acquired file information, the migration manager 11 groups the information in the retention unit 304 ("one year" in the example of FIG. 3). This means that, under the condition that the retention unit herein is a period starting on April 1 and ending on March 31 next year every year, migration is managed by grouping the data files whose retention term arrives in the same year as one group. For instance, a file having its retention term in one year before March 31 in year 20XX is treated, for example, as the group of retention term "XX/04." According to the retention term of each data file thus obtained, the migration manager 11 calculates the data file total capacity for each retention term by adding the capacity 805 of the data files included therein. FIG. 9 schematically describes calculation of the data file total capacity.

Next, the migration manager 11 performs a processing, for each volume 21A and for each retention term, to predict the total amount of the data files to be migrated for the next migration (S703).

Whenever the migration manager 11 performs polling processing, the migration manager 11 acquires the amount information on the data file having the same retention term for one task ID (that is, one volume 21A) from the file information collecting unit 31 of each service server apparatus 30. Then, the migration manager 11 records such information in the migration data amount prediction table 1000 within the migration management database 12. FIG. 10 shows an example of the migration data amount prediction table 1000.

Figures 11, 12:
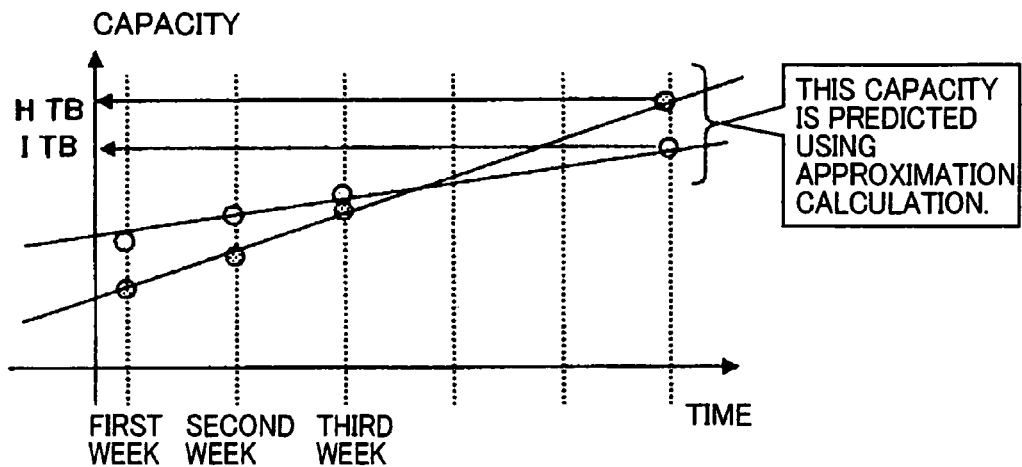
FIG. 11 is an explanatory view of a migration data amount prediction processing.
FIG. 12 shows an example of a migration destination priority table 1200.

In the migration data amount prediction table 1000, a data amount 1003 corresponding to a retention term 1002 (for example, "XX/04" for each polling execution is recorded, for example, as H1, H2, . . . , Hn for the task ID (that is, volume name) 1001. As schematically shown in FIG. 11, if acquiring the amount of data at least through the second polling, the migration manager 11 can extrapolate from the amount of the data acquired through the first polling and the amount of the data acquired through the second polling, hence predicting the migration data amount for next migration. This allows highly accurate prediction of the capacity of the storage area within the external storage system 40, the capacity being reserved as a subsequent migration destination.

Next, the migration manager 11 proceeds to a migration destination determination processing to determine to which disk devices 40A to 40C within the external storage system 40 the data file should be migrated for each retention term. This migration destination determination processing is sequentially performed, for example, from the group closest to the retention term. This is because that the data file in the group with a close retention term has an older creation date and time, and therefore the determination described above needs to be made on such data file with priority.

First, on the disk devices 40A to 40C (disk devices A to C) of the external storage system 40 used as the migration destination, the migration manager 11 performs a migration destination priority determination processing to determine which disk devices A to C should be preferentially selected as the migration destination. In this processing, the retention term 1002 is subtracted from the guarantee threshold 204 of each of the disk devices A to C recorded in the migration destination attribute table 200, and the disk device having a larger difference is determined to has a higher priority. This is because a longer time to the guarantee threshold relative to the predetermined retention term 1002 is more advantageous in migration destination determination considering the time required for the migration, the guarantee threshold specifying application limits of the disk devices A to C used as the migration destination. The determination result is stored in the migration management database 12 as the migration destination priority table 1200. FIG. 12 shows an example of the migration destination priority table 1200. In the migration destination priority table 1200, a name 1201 of the disk devices A to C used as the migration destination and a priority 1202 determined by the above-mentioned determination processing are recorded.

Figure 13:
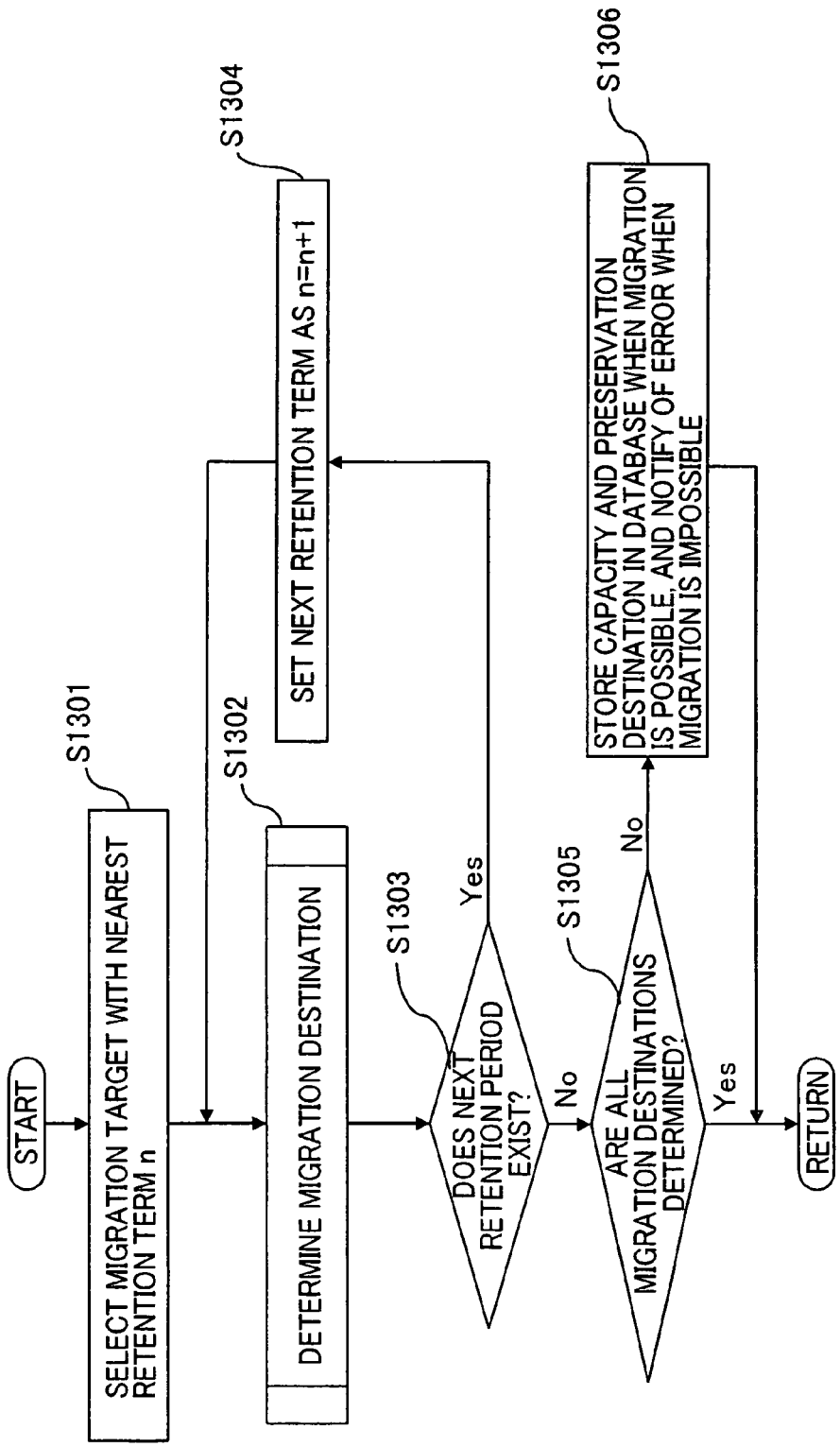
FIG. 13 shows an example of a flow of a migration destination determination processing.

Next, for each group of the data files classified by the retention term, the migration manager 11 performs a processing to determine the migration destination based on the usable capacity of each of the disk devices A to C in descending order of priority thereof (S705). FIG. 13 shows a detailed flow of this migration destination determination processing.

Figure 14:
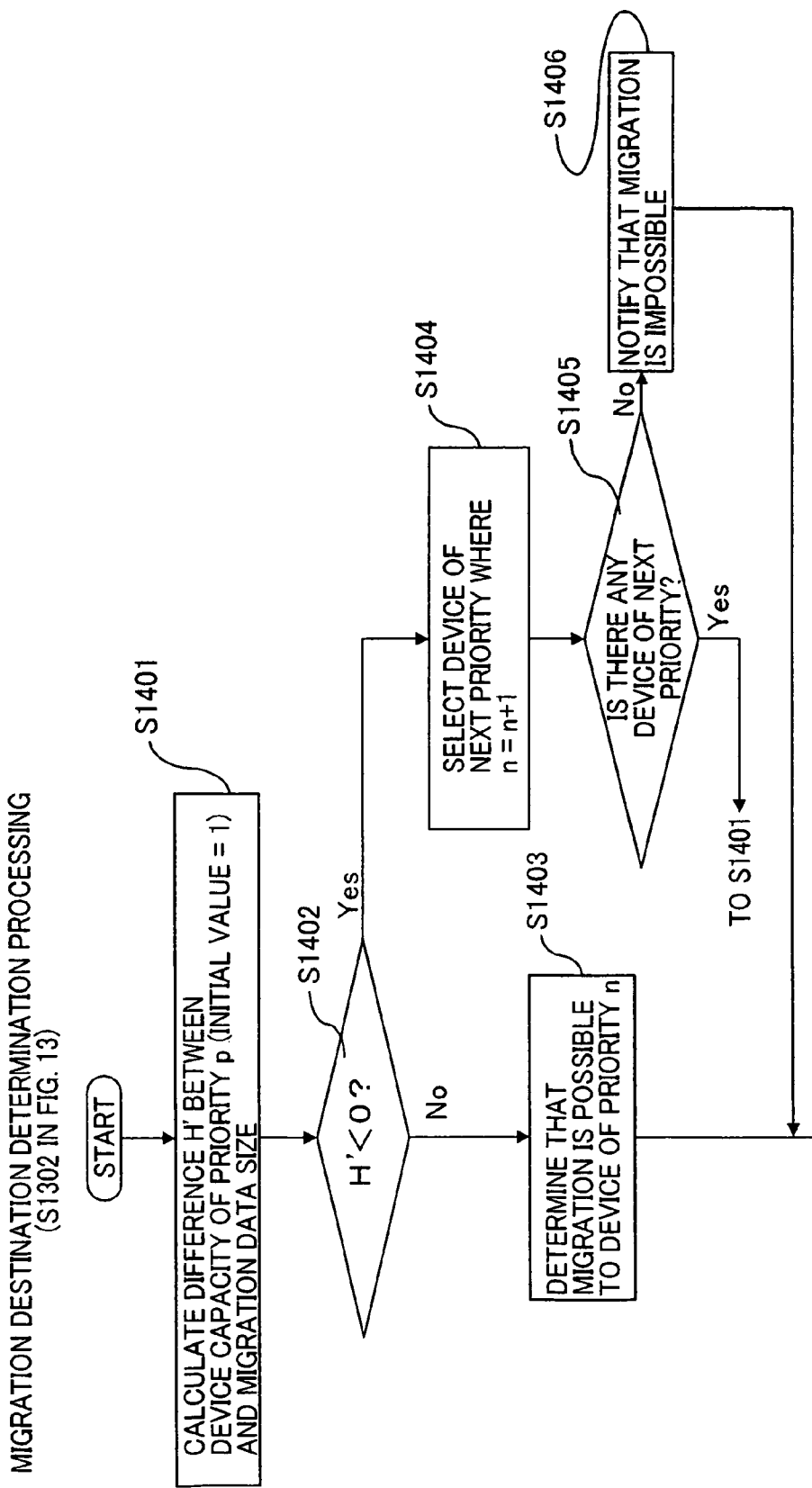
FIG. 14 shows an example of a flow of a migration destination determination processing.

First, the migration manager 11 performs selection according to the retention term 1002, meaning that, the migration manager 11 selects a data file having the retention term 1002 nearest to the current time (S1301). While setting the data file having such retention term 1002 as a migration target, the migration manager 11 proceeds to the migration destination determination processing to further select any of the migration destination disk devices A to C (S1302). FIG. 14 further shows a detailed flow of this migration destination determination processing.

The migration manager 11 refers to the migration destination attribute table 200, and subtracts the currently used capacity 206 from the total capacity 205, thereby calculating the usable capacity as the migration destination for any one of the disk devices A to C having the highest priority in the migration destination priority table 1200. Then, the migration manager 11 acquires an amount of the migration data having the retention term of the migration target from the migration data amount prediction table 1000, and calculates a difference H' between the usable capacity and the amount of the migration data (S1401).

Next, the migration manager 11 determines a value of the H'. When determining that it is not H'<0 (S1402, No), the migration manager 11 determines that all the data files of the same retention term can be migrated to one of the disk devices A to C with the highest priority (S1403), thus returning to the flow of FIG. 13.

If the migration manager 11 determines that H'<0 (S1402, Yes), then all the data files of the same retention term cannot be migrated to one of the disk devices A to C with the highest priority, and thus the migration manager 11 searches for another one of the disk devices A to C with the second highest priority, with reference to the migration destination priority table 1200 (S1404).

When the migration manager 11 determines that there is one disk device with the second highest priority among the disk devices A to C (S1405, Yes), the migration manager 11 returns to S1401 and examines such disk device of the disk devices A to C with the second highest priority with respect to the usable capacity. The migration data amount herein is an amount of data in which the amount of data already enabled to migrate to one of the disk devices A to C with a higher priority (equivalent to the usable capacity of the one of the disk devices A to C) is subtracted in advance.

Note that, as mentioned above, for the data files having the same retention term, the data file having the older creation date and time thereof is preferentially allocated to one of the migration destination disk devices A to C with the highest priority. In other words, the data files are sorted in order of the older creation date and time. In accordance with the priorities of the migration destination disk devices A to C, the data files are then allocated to the disk devices A to C up to the usable capacities thereof, sequentially from the data file having the oldest creation date and time.

A determination that the one of the disk devices A to C with the second highest priority does not exist (S1405, No) indicates that no migration destination capable of storing all the data amount to be migrated exists within the external storage system 40. Therefore, a system administrator is notified that the capacity of the external storage system 40 is insufficient, and that a measure such as addition of disk device is necessary (S1406).

When the migration destination of the data files having the same retention term (for example, "XX/04") is determined (or the migration is determined to be impossible) through the flow of FIG. 14, the migration manager 11 returns to the migration destination determination processing of FIG. 13 again. The migration manager 11 determines whether there is any group of the data files having the next retention term (S1303). When it is determined that there is such group (S1303, Yes), the migration manager 11 executes the flow of FIG. 14 with respect to the next retention term (S1305).

If determining that there is no group of the data files having the next retention term (S1303, No), then the migration manager 11 examines whether or not the migration destination has been determined for all the retention terms (S1305). When it is determined that such migration destination has been determined (S1305, Yes), the migration manager 11 returns to the flow of the polling of FIG. 7. When it is determined that the migration destination has not been determined (S1305, No), with respect to the group of the retention term whose migration destination is determined, the total capacity 1502 and the amount of the data 1503 stored in each of the migration destination disk devices A to C are recorded for each retention term 1501 with the determined migration destination (S1306, and S706 of FIG. 7) in the migration destination determination table 1500 stored in the migration management database 12. With respect to the group of the retention term whose migration destination is not determined, the system administrator is notified that migration destination is undecided (S1306).

Now, the migration destination on the basis of the migration data amount is determined, and the processing returns to S707 of FIG. 7. Next, the migration manager 11 performs the migrations, on a trial basis, to the determined migration destination disk devices A to C for each preservation term (S707).

In order to avoid unnecessary load over the business application or the like that is operating on the service server apparatuses 30 in the trial of migration, a part of the data files included in each retention term is actually migrated respectively to the determined migration destination disk devices A to C, so that the necessary time in real migration is predicted. The amount of data used for this trial is set as the sampling amount 404 of the migration management table 400 for each task ID, and is set 1% of the total capacity in the case of the present embodiment. This means that every 1% of the migration data amount allocated to each of the migration destination disk devices A to C, is migrated.

Figure 17:
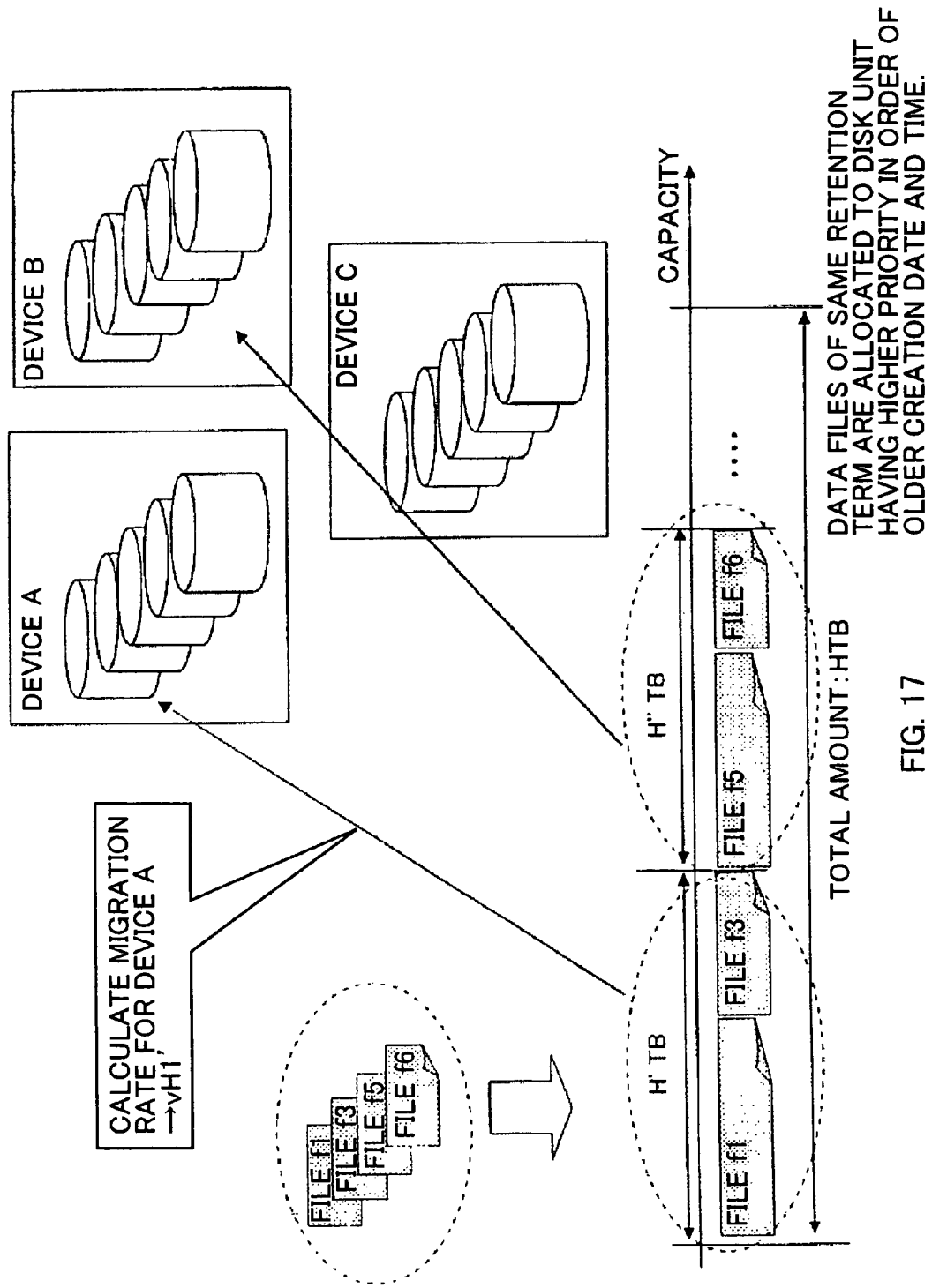
FIG. 17 is a schematic explanatory view of a migration test.

The result of this migration trial is recorded in the migration test result table 1600 of the migration management database 12. In the migration test resulting table 1600, a retention term 1601, an amount of data 1602 used for the test, necessary time 1603 for each of the migration destination disk devices A to C, and a data migration rate 1604 are recorded. The data migration rate 1604 is calculated from (amount of data used for the test/necessary time), for example, in units of (kilobytes/second). FIG. 17 schematically shows a situation of preferentially allocating the data file having the older creation date and time among the data files of the same retention term, as well as the data migration rate calculation for each of the migration destination disk devices A to C through the migration test.

Next, the migration manager 11 calculates the migration necessary time for each retention term and for each of the migration destination disk devices A to C, with reference to the migration test result table 1600 (S708). In the case of present embodiment, this migration necessary time can be obtained by multiplying time (for example, tH') needed for the migration trial by 100 for each disk device 40A to 40C. The calculated necessary time is recorded in a migration flag determination table 1800 of the migration management database 12. FIG. 18 shows an example of the migration flag determination table 1800. In the migration flag determination table 1800, a migration data amount 1802 and data migration necessary time 1803 to each of the migration destination disk devices A to C are recorded for a retention term 1801. Thereby, migration flag determination is ready, in which the product life of the migration destination disk devices A to C and the migration necessary time to each migration destination disk device are taken into consideration.

Figure 19:
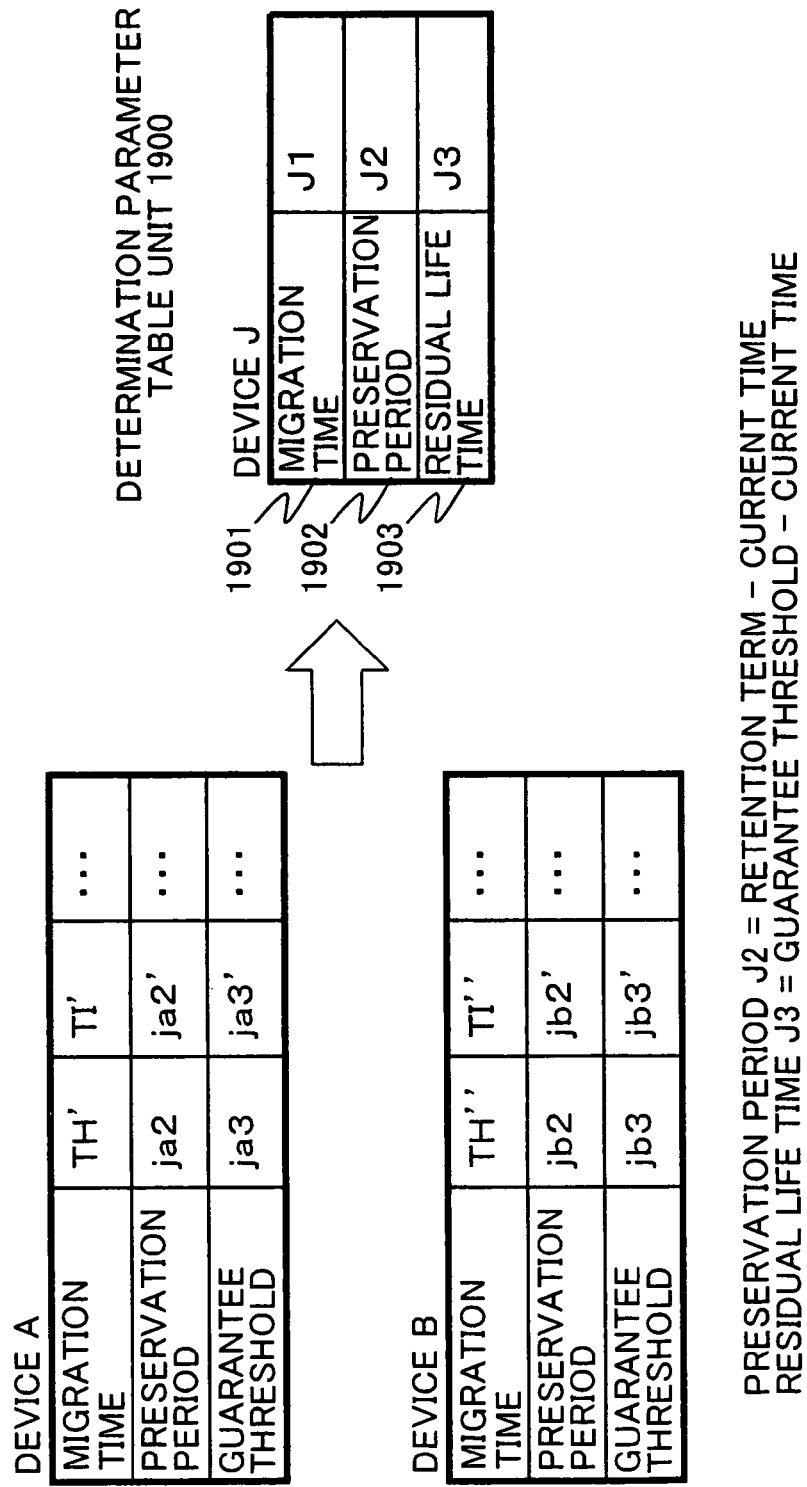
FIG. 19 shows an example of a determination parameter table 1900.

Next, for each retention term and for each of the migration destination disk devices A to C, the migration manager 11 acquires or calculates migration necessary time J1, a preservation period J2, and residual life time J3, and records these information in a migration destination determination parameter table 1900 of the migration management database 12 (S709). FIG. 19 schematically shows an example of the migration destination determination parameter table 1900.

In the migration flag determination parameter table 1900, migration necessary time 1901, a preservation period 1902, and residual life time 1903 are recorded. The migration necessary time 1901 is acquired from the migration flag determination table 1800 for each of the disk devices 40A to 40C. The preservation period 1902 is a numeric value obtained by subtracting the current time from the retention term of the data file groups subjected to migration flag determination, and indicates time for the data files to be stored in the respective migration destination disk devices A to C. The residual life time 1903 is a numeric value obtained by subtracting the current time from the guarantee threshold 204 of each of the disk devices 40A to 40C recorded in the migration destination attribute table 200, and indicates residual time during which each of the disk devices 40A to 40C can be used as the migration destination disk devices A to C.

Figure 20:
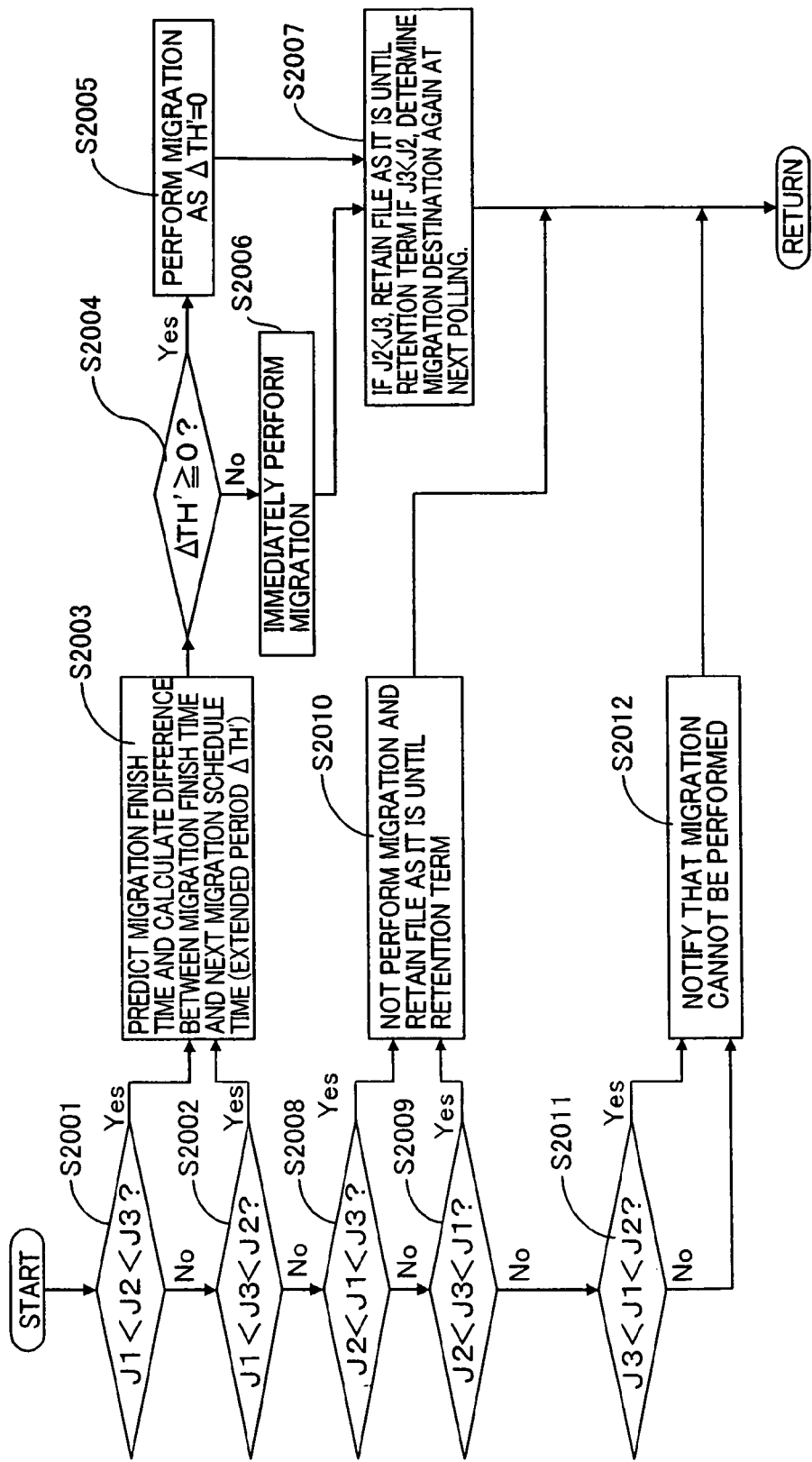
FIG. 20 shows an example of a flow of a migration flag determination processing.
Figure 21:
FIG. 21 shows an example of a migration finish schedule time table 2100.

Next, by using the above-mentioned parameters J1, J2, and J3, the migration manager 11 performs a migration flag determination processing, for each preservation term and for each of the migration destination disk devices A to C, in order to determine whether or not to permit migration (S710). FIG. 20 shows a detailed flow of the migration flag determination processing.

First, the migration manager 11 determines a relationship among the migration necessary time J1, the preservation period J2, and the residual life time J3 in terms of the time length (S2001, S2002, S2008, S2009, S2011). Accordingly, the subsequent processing is divided into six patterns.

==When it is determined that migration necessary time J1<preservation period J2<residual life time J3, or migration necessary time J1<residual life time J3<preservation period J2==

When it is determined as described above (S2001 or S2002, Yes), the migration manager 11 calculate a migration finish schedule time by adding the migration necessary time J1 to the current time t. The calculated migration finish schedule time 2102 is recorded in the migration finish schedule time table 2100 stored in the migration management database 12, for each retention term 2101 and for each of the disk devices A to C.

Next, the migration manager 11 acquires the migration schedule period 505 from the migration operation management table 500, the migration schedule period 505 being set for the service server apparatus 30 that is the management source of the data file subjected to the migration. The migration manager 11 calculates a next migration execution schedule time by adding the migration schedule period 505 to a last migration execution time. Then, the migration manager 11 calculates an extended period (ΔTH') that is a time difference between the migration finish schedule time 2102 acquired from the migration finish schedule time table 2100, and the next migration execution schedule time (S2003). This extended period ΔTH' means a period of time allowed until the next migration execution schedule time in the case where migration of the data file of the retention term (for example, a retention term of "XX/04") is completed before the next migration execution schedule time.

When determining that there is the extended period (ΔTH'≦0) (S2004, Yes), the migration manager 11 sets a time obtained by adding the extended period ΔTH' to the current time t, as a migration start time, and then records the time in the migration management database 12. Thereafter, when determining that the migration start time has come, the migration manager 11 executes migration (S2005), and proceeds to S2007.

When determining that there is no extended period (ΔTH'<0) (S2004, No), the migration manager 11 immediately executes migration (S2006), and proceeds to S2007.

A different processing is performed in S2007 depending on the relationship between the preservation period J2 and the residual life time J3 with respect to the time length. When it is determined that J2<J3 (S2001, Yes), the preservation period J2 will be completed before the residual life time J3 of the disk devices 40A to 40C is worn out. Accordingly, after migration, the data files are stored as it is in the respective disk devices 40A to 40C of the migration destination until the retention term.

When it is determined that J3<J2 (S2002, Yes), the preservation period J2 will have to continue beyond the residual life time J3 of the disk devices 40A to 40C. Accordingly, the processing returns to the flow of the migration polling in FIG. 7, and this migration destination determination processing is again performed in the next polling.

Figure 22:
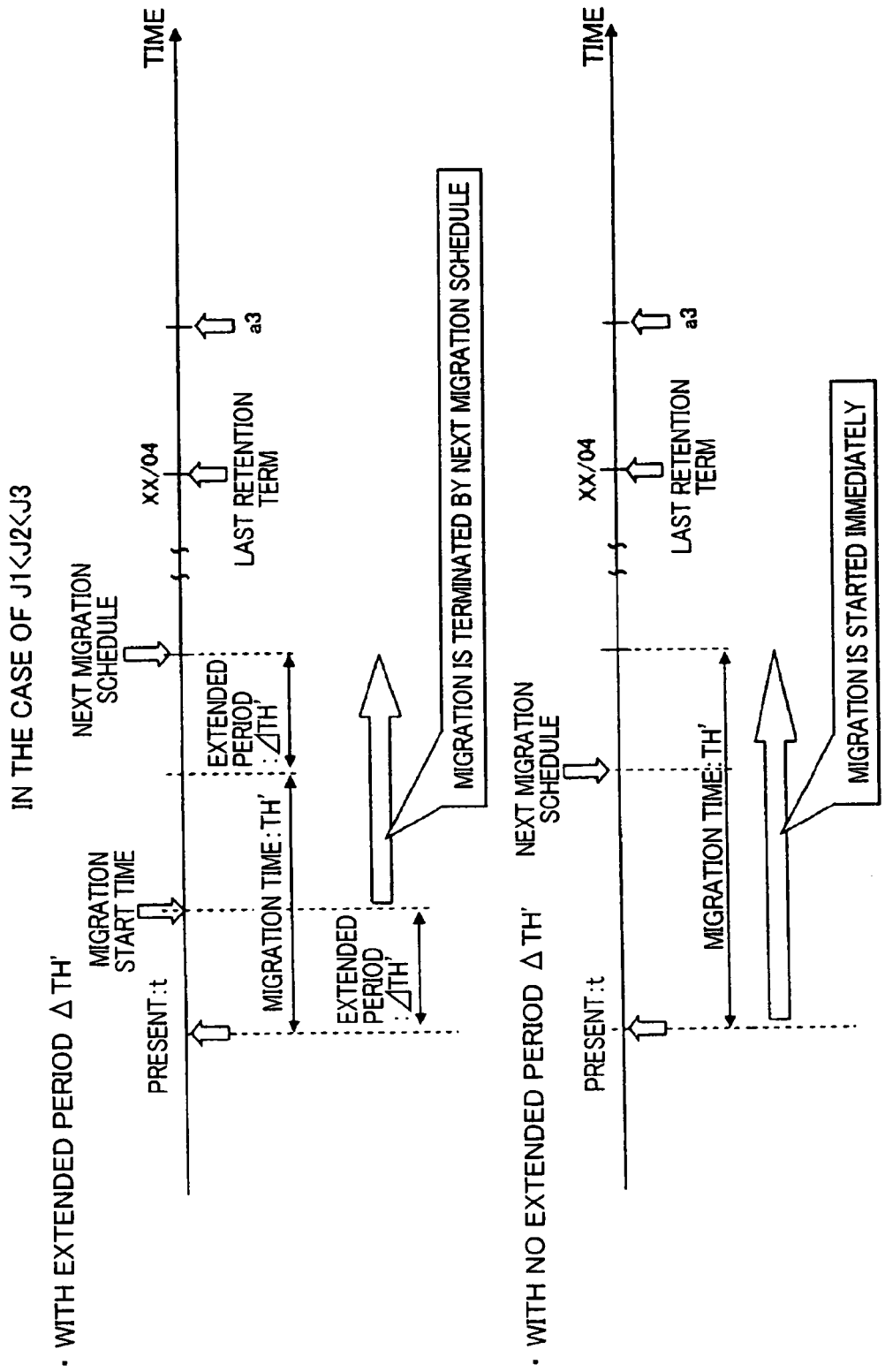
FIG. 22 is a schematic explanatory view 1 of the migration flag determination processing.
Figure 23:
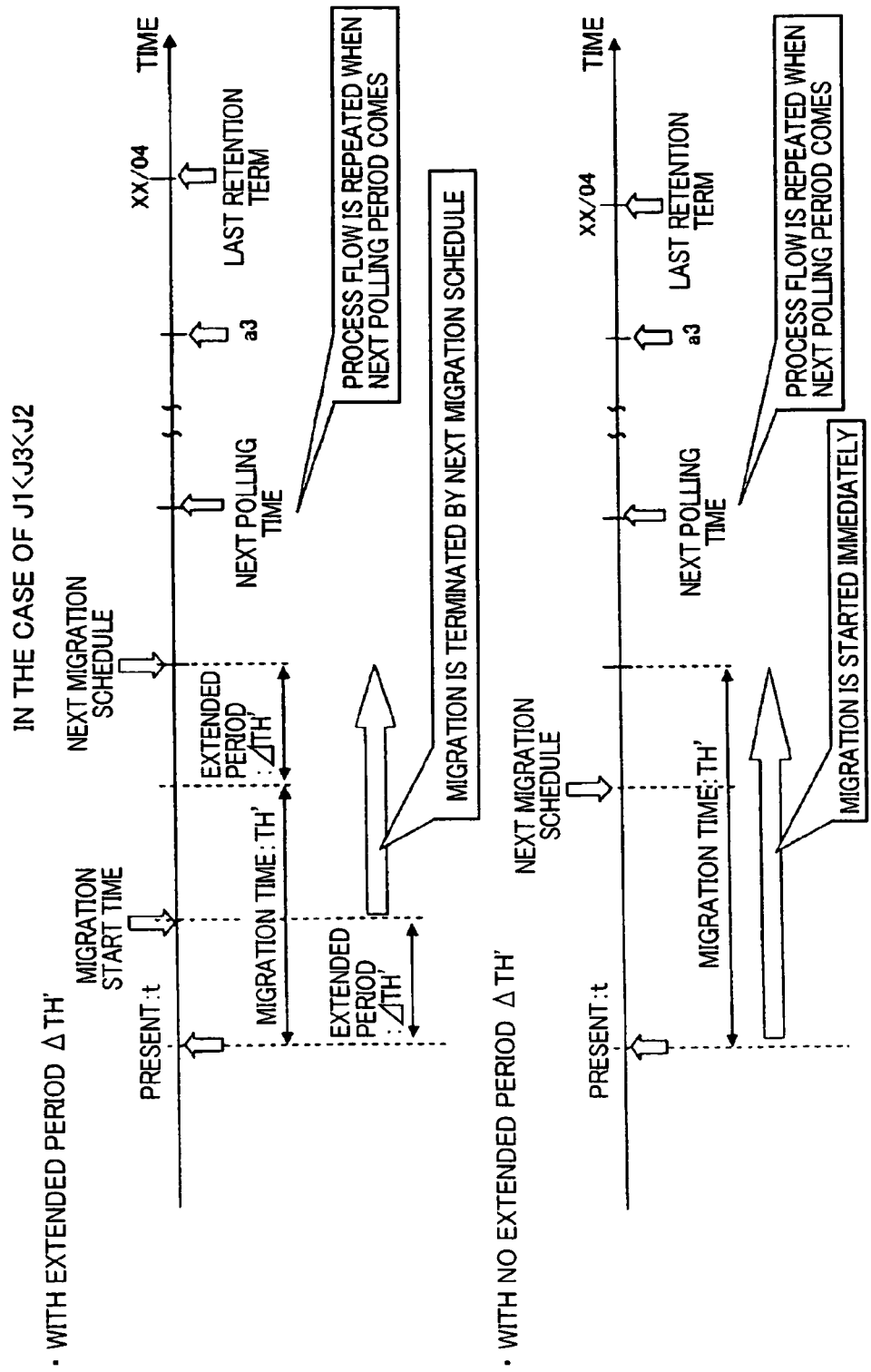
FIG. 23 is a schematic explanatory view 2 of the migration flag determination processing.

FIG. 22 schematically shows a processing executed in the case of a pattern in which migration necessary time J1<preservation period J2<residual life time J3. FIG. 23 schematically shows a processing executed in the case of a pattern in which migration necessary time J1<residual life time J3<preservation period J2.

==When it is determined that preservation period J2<migration necessary time J1<residual life time J3, or preservation period J2<residual life time J3<migration necessary time J1==

When it is determined as described above (S2008 or S2009, Yes), the migration manager 11 determines that it is unnecessary to perform migration, and terminates the processing. The reason is because the preservation period J2 ends before the residual life time J3 of the disk devices A to C even when it is determined to be either of the patterns, and thus there is no need for performing migration.

Figure 24:
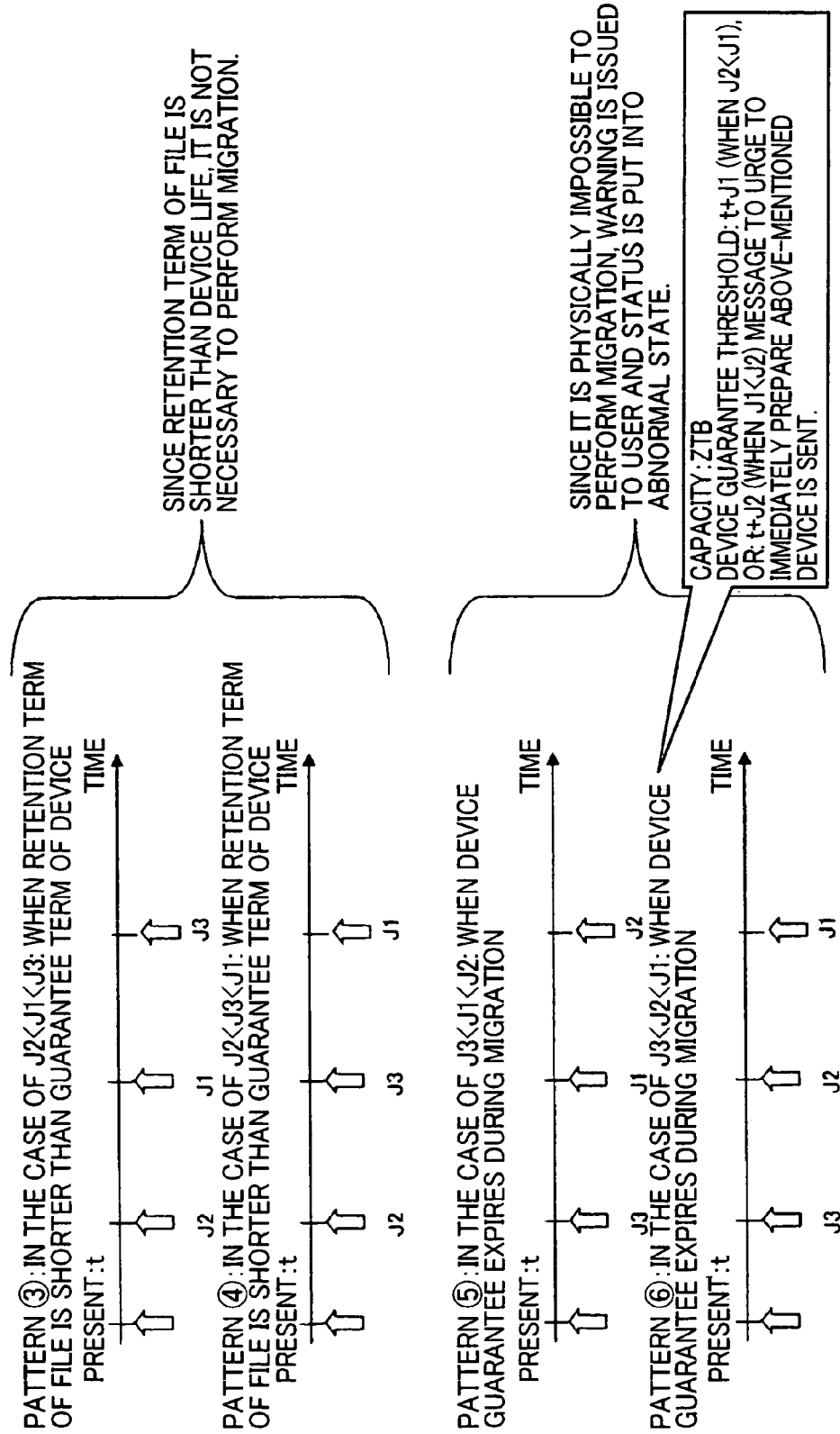
FIG. 24 is a schematic explanatory view 3 of the migration flag determination processing.

FIG. 24 schematically shows a processing when it is determined to be the above-mentioned patterns.

==When it is determined that residual life time J3<migration necessary time J1<preservation period J2, or residual life time J3<preservation period J2<migration necessary time J1==

When it is determined as described above (S2011, Yes or No), the migration manager 11 determines that it is physically impossible to perform migration, and notifies the system administrator of this fact (S2012). The reason is because the residual life time J3 of the disk devices 40A to 40C is completed during migration execution to the migration destination disk devices A to C, and thus the migration cannot be completed. More specifically, to the system administrator, the migration manager 11 sends a message, for example, to prompt the system administrator to prepare a disk device that has its usable capacity not less than the migration data amount allocated to corresponding one of the migration destination disk devices A to C to which the migration manager 11 has determined to be impossible to migrate, and the disk device that satisfies a condition that the guarantee threshold 204 is current time t+migration necessary time J1 (when J2<J1) or current time t+preservation period J2 (when J1<J2).

FIG. 24 schematically shows a processing when a case is determined to be the above-mentioned patterns.

As described in details above, according to the embodiment of the present invention, such an effect that the data stored in the storage apparatus can be securely kept until the retention term of each data by considering the device life of the storage apparatus and the time needed for data migration, is obtained.

The invention claimed is:

1. A storage system, comprising:
a storage apparatus that provides a plurality of logical volumes allocated to a server apparatus as a storage area that stores a data file generated by the server apparatus;
a plurality of storage devices that are coupled to the storage apparatus and that provide a plurality of storage areas to which the data file stored in the storage apparatus is copied; and
a data copy processing unit that performs the following operations:
acquiring preservation period information that indicates a preservation period of the data file from the server apparatus, and calculating the preservation term of the data file from the preservation period information;
managing a respective operation guarantee term for the storage apparatus and each of the storage areas of the plurality of storage devices;
acquiring information indicating a data amount of the data file from the server apparatus;
selecting a first storage area of the plurality of storage areas of the plurality of storage devices based on a comparison of the data amount of the data file and a respective capacity of each of the plurality of storage areas of the plurality of storage devices; and
calculating data copy necessary time needed to copy the data file from a second storage area of the plurality of storage areas of the plurality of storage devices in which the data file is stored to the first storage area; and
wherein the data copy processing unit determines whether a remainder of the respective operation guarantee term for the first storage area is less than the calculated data copy necessary time,
wherein, upon determining that the remainder of the respective operation guarantee term for the first storage area is less than the calculated data copy necessary time, the data copy processing unit determines that copying the data file to the first storage area is not possible and outputs information indicating the determination, and
wherein, upon determining that the remainder of the respective operation guarantee term for the first storage area is not less than the calculated data copy necessary time, the data copy processing unit starts copying the data file from the second storage area to the first storage area upon a migration start time, which is set based on the respective operation guarantee term for the second storage area and the calculated data copy necessary time, being reached.

2. The storage system according to claim 1, wherein, if the preservation term for the data file is less than the respective operation guarantee terms for the first and second storage areas, the data copy processing unit does not perform copying of the data file to the first storage area.

3. The storage system according to claim 1, wherein, when the preservation term of the data file is determined to be within a predetermined period, the data copy processing unit collectively sets a plurality of data files thus determined as a target of data copy.

4. The storage system according to claim 1, wherein, the data copy processing unit copies a part of the data file stored in the first storage area to the second storage area, and acquires a partial copy necessary time taken for the copy of the part of the data file; and
wherein the data copy processing unit calculates the data copy necessary time based on the partial copy necessary time.

5. The storage system according to claim 1, wherein, in selecting the first storage area, for each of the plurality of storage areas, a total storage capacity and a used storage capacity are acquired, and a usable storage capacity, which is a difference between the total storage capacity and the used storage capacity, is calculated; and
wherein the data copy processing unit selects, as the first storage area, a storage area for which the usable storage capacity is not less than the data amount of the data file by comparing the data amount and each of the usable storage capacities of the plurality of storage areas.

6. The storage system according to claim 5, wherein the data copy processing unit compares the respective operation guarantee term of each of the plurality of storage areas with the preservation term of the data file;
wherein the data copy processing unit gives a higher priority to a storage area determined to have a longer time interval between the preservation team of the data file and the respective operation guarantee term of the storage area from among the plurality of storage areas whose respective operation guarantee terms are determined to come after the preservation term; and
wherein the data copy processing unit selects the first storage area from the plurality of storage areas according to descending order of priority.

7. The storage system according to claim 1, wherein the data copy processing unit acquires and records the data amount of the data file periodically; and
wherein, based on an increase of the data amount, the data copy processing unit calculates a data amount predicted value of the data file when copying the data file.

8. A method performed by a storage system for operating the storage system, the storage system including a storage apparatus that provides a plurality of logical volumes allocated to a server apparatus as a storage area that stores a data file generated by the server apparatus, and a plurality of storage devices that are coupled to the storage apparatus and that provide a plurality of storage areas to which the data file stored in the storage apparatus is copied, the method comprising:
acquiring preservation period information that indicates a preservation period of the data file from the server apparatus, and calculating the preservation term of the data file from the preservation period information;

managing a respective operation guarantee term for the storage apparatus and each of the storage areas of the plurality of storage devices;

acquiring information indicating a data amount of the data file from the server apparatus;

selecting a first storage area of the plurality of storage areas of the plurality of storage devices based on a comparison of the data amount of the data file and a respective capacity of each of the plurality of storage areas of the plurality of storage devices;

calculating data copy necessary time needed to copy the data file from a second storage area of the plurality of storage areas of the plurality of storage devices in which the data file is stored to the first storage area;

determining whether a remainder of the respective operation guarantee term for the first storage area is less than the calculated data copy necessary time, upon determining that the remainder of the respective operation guarantee term for the first storage area is less than the calculated data copy necessary time, determining that copying the data file to the first storage area is not possible and outputting information indicating the determination, and upon determining that the remainder of the respective operation guarantee term for the first storage area is not less than the calculated data copy necessary time, starting copying the data file from the second storage area to the first storage area upon a migration start time, which is set based on the respective operation guarantee term for the second storage area and the calculated data copy necessary time, being reached.

* * * * *